Jan. 5, 1960  D. W. MOLINS ET AL  2,919,531
CIGARETTE-MAKING MACHINERY

Filed Feb. 27, 1956  9 Sheets-Sheet 1

Fig. 1.

INVENTORS
DESMOND W. MOLINS
GEORGE F. PEMBROKE
HARRY WILLIAMS
BY
Watson, Cole, Grindle & Watson
ATTORNEYS Jan. 5, 1960  D. W. MOLINS ET AL  2,919,531
CIGARETTE-MAKING MACHINERY
Filed Feb. 27, 1956  9 Sheets-Sheet 4

INVENTORS
DESMOND W. MOLINS
GEORGE F. PEMBROKE
HARRY WILLIAMS
BY
Watson, Cole, Grindle & Watson
ATTORNEYS

Fig. 10.

Jan. 5, 1960   D. W. MOLINS ET AL   2,919,531
CIGARETTE-MAKING MACHINERY

Filed Feb. 27, 1956   9 Sheets-Sheet 8

Fig. 11.

INVENTORS
DESMOND W. MOLINS
GEORGE F. PEMBROKE
HARRY WILLIAMS
BY
Watson, Cole, Grindle & Watson
ATTORNEYS Jan. 5, 1960 D. W. MOLINS ET AL 2,919,531
CIGARETTE-MAKING MACHINERY
Filed Feb. 27, 1956 9 Sheets-Sheet 9

INVENTORS
DESMOND W. MOLINS
GEORGE F. PEMBROKE
HARRY WILLIAMS
BY

Watson, Cole, Grindle & Watson
ATTORNEYS

United States Patent Office 2,919,531
Patented Jan. 5, 1960

2,919,531

CIGARETTE-MAKING MACHINERY

Desmond Walter Molins, George Frederick Pembroke, and Harry Williams, Deptford, London, England, assignors to Molins Machine Company Limited, London, England, a British company Application February 27, 1956, Serial No. 568,097

Claims priority, application Great Britain March 1, 1955

17 Claims. (Cl. 53—236)

This invention concerns improvements in or relating to cigarette-making machinery.

Manufacture of cigarettes is mainly carried out by means of cigarette machines of the continuous rod type. Machines of this type are too well known to need detailed description, and for the purposes of this specification it need only be said that, in general, such a machine usually comprises a tobacco hopper, a bed usually extending alongside and beyond the hopper, along which bed runs a stream of tobacco received from the hopper, which stream is enclosed in a paper web to form a "continuous rod"; cutting mechanism at the end of the bed to cut the rod into individual cigarette lengths; and a conveyor, usually called a "catcher band," running transversely of the bed usually at right angles to it, on to which the cigarettes are deflected sideways from the rod line. The catcher band may extend to either side of the bed, but in a batch of cigarette machines it is usual for the catcher bands all to extend in the same direction.

Cigarettes can be collected from the catcher band either by hand or mechanically. In the former case an attendant (referred to hereinafter for convenience as a "catcher girl") is responsible for collecting and disposing of cigarettes, which are usually placed in "trays" which are open-sided and deep and long relatively to their width, which latter is about equal to the length of a cigarette. Where mechanical means are used, the actual collection of cigarettes into trays can be done automatically. An example of apparatus for automatically collecting cigarettes from a catcher band is disclosed in U.S. patent specification No. 2,603,395.

In most cigarette factories the cigarette machines are arranged side by side parallel to one another in rows, in such a manner that the catcher bands of all the machines in a row point in the same direction and are in line or nearly so. Arrangements vary in different factories, but broadly speaking it is usual to find a row of cigarette machines side by side, with their catcher bands extending in line alongside an open space that serves as a corridor and may be bounded on the other side by a further row of cigarette machines, or possibly other machines, or by a wall. In all cases it will be clear that as economy of floor space is very important, the machines should be placed as close together as is practicable, and likewise the corridor just mentioned should be as narrow as is practicable. The spacing of the machines must, however, be such as to leave room for the machine operators and the catcher girls to attend to their duties, and also to leave room for the passage of other operatives, for the disposal and replacement of filled trays of cigarettes, and for the supply of fresh tobacco to the hoppers of the machines. In addition it will be appreciated that there should be room for people to pass through a row of machines so as to be able to move from one corridor to the next without walking to the end of the row of machines.

Usually a number of trays are stationed close to the catcher band of each cigarette machine so that they can conveniently be filled one after the other, either by hand or automatically, and then removed and replaced by empty trays. These trays are often placed on tables or trolleys of some kind which are placed in some convenient position which is necessarily near the end of the catcher band. The most practical position is just beyond the end of the catcher band, and this of course adds to the distance required between adjacent machines to allow free passageway between them. If the trolley were placed in the corridor it would still have to be located beyond the end of the catcher band, because the catcher girl normally sits or stands in the corridor beside the catcher band, to which she must have free access. Moreover if the trolley were placed alongside the catcher band on the side remote from the catcher girl, it would be difficult for her to place filled trays on it or take empty trays from it, and in addition, of course, this arrangement would require the same spacing between the end of the catcher band and the next machine as if the trolley were stationed beyond the end of the catcher band, as otherwise there would not be enough room for the trolley to be moved into the corridor.

Manufacturers are naturally concerned to increase production where possible, and these factors affecting the spacing and arrangement of cigarette machines have an important bearing on this problem. The output of a cigarette machine cannot be increased beyond certain speeds—at the present time, say between 1000 and 1250 cigarettes per minute—without reducing the quality of the cigarettes. An alternative is to use more machines, and here the problem of floor space arises. Manufacturers sometimes find themselves unable to accommodate additional machines in their existing factories, while the extra production required may not warrant fresh building or rebuilding.

It is an object of the present invention to provide means whereby production of cigarettes can be increased for a given floor space, and also for a given number of attendants, while the quality of the cigarettes can be maintained.

According to the invention there is provided a cigarette production unit which comprises two continuous rod cigarette-making machines arranged side by side, wherein the catcher bands of the two machines extend from the respective machines in opposite directions towards each other so as to convey cigarettes from both machines to a common collecting station (e.g. adjacent to the ends of the two opposed catcher bands). Automatic collecting mechanism may be provided to collect the combined product of the two machines at the said collecting station (e.g. in trays).

By this arrangement, a substantial reduction in the spacing between two adjacent machines can be effected. Further, this arrangement makes it possible to accommodate trays for both machines in a single trolley, which can be located at a position which would in a conventional arrangement not be available for it—namely a position which, in the conventional arrangement, would be partly occupied by that catcher band which, in the present arrangement, has its normal direction reversed.

Conveyor-means may be provided to convey trays in succession through said collecting station, and means to feed the combined product of said cigarette-making machines into the said trays as the latter pass through the collecting station. The said conveyor-means may comprise means to feed trays lengthwise in one direction in a path past said collecting station, means to move trays sideways into an adjacent path, and means to feed said trays lengthwise in said adjacent path through said collecting station in a direction reverse to said one direction.

The apparatus may comprise a receptacle for trays (e.g. a trolley) adjacent one end of said conveyor-means, said receptacle being movable in a direction transverse to said paths to bring successive trays into register with one of said paths, and arranged to be connected to and disconnected from said conveyor-means, and means to effect movement of said receptacle by a predetermined distance, said last-named means including means to disconnect the receptacle from the said conveyor-means to permit said movement, and to reconnect the receptacle to the said conveyor-means when the receptacle has moved said predetermined distance.

The said conveyor-means may comprise a fixed part and a liftable (e.g. pivoted) part, and the said liftable part and the said receptacle respectively may comprise inter-engageable parts whereby the receptacle and the conveyor-means can be locked together at different positions of the receptacle, and comprising a movable pawl on said fixed part and abutments carried by said receptacle and engageable by said pawl to move the receptacle, and means to move said pawl, said last-named means being operative to raise and lower said liftable part, thereby disconnecting said inter-engageable parts to permit movement of the receptacle, and then reconnecting them.

The apparatus may comprise a lever to effect movement of said pawl, a toggle operative to raise and lower said liftable part, and means connecting said toggle to said lever for operation by the latter. The means to move trays sideways from the said one path to the said adjacent path may comprise a pair of cranks arranged to engage successive trays and push them sideways. The said cranks may be arranged for rotation about substantially vertical axes and below the level of the tray, means being provided to cause upward movement of the cranks so that upwardly projecting elements (e.g. rollers) thereon engage the side of a tray and push the latter sideways.

The said cranks may be keyed on vertical shafts and movable up and down on said shafts by cam-operated means arranged to be operated in timed relationship with the said conveyor-means.

Two catcher bands, arranged side by side (e.g. at different levels) may extend from each cigarette-making machine, transfer means being provided to cause cigarettes to be transferred from one to the other (e.g. from the higher to the lower) of the said two catcher bands, whereby a single row of cigarettes coming from each machine is delivered to the collecting station. The said transfer means may comprise a movable member arranged obliquely across the said one catcher band and arranged to move with a component transverse to the direction of movement of said one catcher band, and another component which is in the said direction and has substantially the same speed as the forward movement of the said catcher bands.

Further according to the invention there is provided apparatus for causing stepwise movement of a first member (e.g. a trolley or the like for cigarette trays) relatively to a second member (e.g. a conveyor bed or the like on to which trays are to be moved from the trolley) the said second member comprising a fixed part and a liftable (e.g. pivoted) part, a pawl movably mounted on said fixed part and adapted to engage teeth carried by the first member and to move said teeth so as to move the first member stepwise, inter-engaging parts on the first member and on said liftable part of the second member, respectively, by which the two members can be locked together, and means to move the said pawl and at the same time to raise and lower said liftable part in such manner as to disengage the two members to permit movement of the first member by the said pawl, and to re-engage the two members in locked relationship after such movement.

The said means to raise and lower the said liftable part may comprise a toggle joint connected to a lever on which said pawl is mounted, whereby movement of said lever (e.g. to move the pawl rearwardly) operates the toggle so as to raise the liftable part.

Still further according to the invention there is provided in cigarette collecting mechanism means to feed cigarette receptacles endwise in two side by side paths, and transfer means to transfer a receptacle from one path to the other, said transfer means comprising a pair of cranks arranged to engage one side of said receptacle and push the receptacle sideways. The said cranks may be arranged for rotation about substantially vertical axes and below the level of the receptacle, means being provided to cause upward movement of the cranks so that upwardly projecting elements (e.g. rollers) thereon engage the side of a tray and push the latter sideways. The said cranks may be keyed on vertical shafts and be movable up and down on said shafts by cam-operated means arranged to be operated in timed relationship with the said means to feed the cigarette receptacles.

Still further according to the invention there is provided in or for cigarette-feeding apparatus, means to transfer cigarettes from a row of cigarettes travelling in a path in a direction transverse to their axes, to a second path which extends alongside the first said path of said row, comprising a movable member arranged obliquely across the first said path and arranged to move with a component in the direction in which it is desired to transfer the cigarettes, and another component which is in the direction of and has substantially the same speed as the forward movement of the said row.

A cigarette production unit according to the invention will now be described by way of example with reference to the accompanying drawings, in which.

Figure 1:
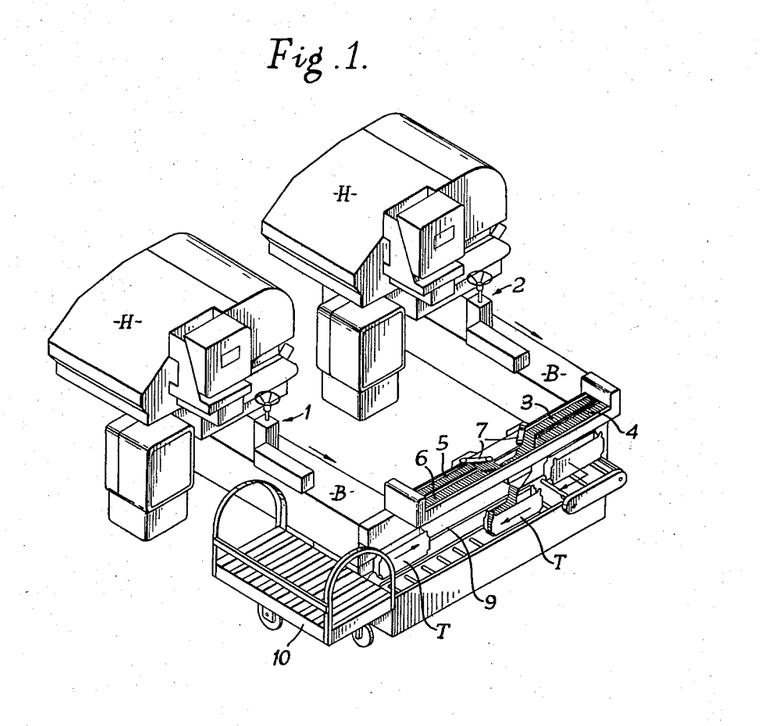
Figure 1 is a perspective view showing in outline a cigarette production unit according to the invention.

Referring first to Figure 1, this shows in outline a cigarette production unit comprising two continuous rod cigarette-making machines 1 and 2, arranged side by side, and each comprising a hopper H for tobacco, and a bed B along which a continuous cigarette rod is conveyed lengthwise, in the direction shown by the arrow. At the end of the bed of each machine is provided a cutting device to cut the rod into individual cigarettes in the well-known way.

The machine 2 is provided with two parallel catcher bands 3 and 4 extending at right-angles to the bed and movable in the direction in which they would normally extend if the machine were used as an isolated unit, as is the common practice. The machine 1 is provided with two parallel catcher bands 5 and 6, similar to the band 3 and 4 but extending from the bed of the machine 1 in the opposite direction to that of the bands 3 and 4. Thus the catcher bands associated with the two machines extend and run towards each other so as to convey cigarettes from both machines towards a common collecting station, at which they are collected into trays. In Figure 1 the catcher bands are shown carrying rows of cigarettes.

The bands 3 and 5 respectively are arranged at a higher level than the bands 4 and 6, and transfer devices 7 are provided to transfer cigarettes from the bands 3 and 5 to the bands 4 and 6 so that they can be delivered in single rows to the collecting station.

Figure 1 also shows diagrammatically conveyor-means for conveying trays T in opposite directions and in two side-by-side paths beneath the catcher bands and through the collecting station. Three of these trays are shown in Figure 1, one of which is shown receiving cigarettes at the collecting station. The conveyor-means shown in Figure 1 includes a conveyor 9 positioned to receive successive trays from a receptacle consisting of a trolley 10. The trolley is partitioned to receive eight trays, and is arranged for movement transversely of the direction of movement of trays on the conveyor-means, so that it can be moved forwardly stepwise so as to bring successive empty trays into line with the conveyor 9, and successive empty spaces into line with the adjacent path along which filled trays return towards the trolley. Means (not shown in Figure 1 but described in detail later) are provided for connecting and disconnecting the trolley and the conveyor-means, and devices are also provided for shifting trays from one path to the adjacent path.

Figure 2:
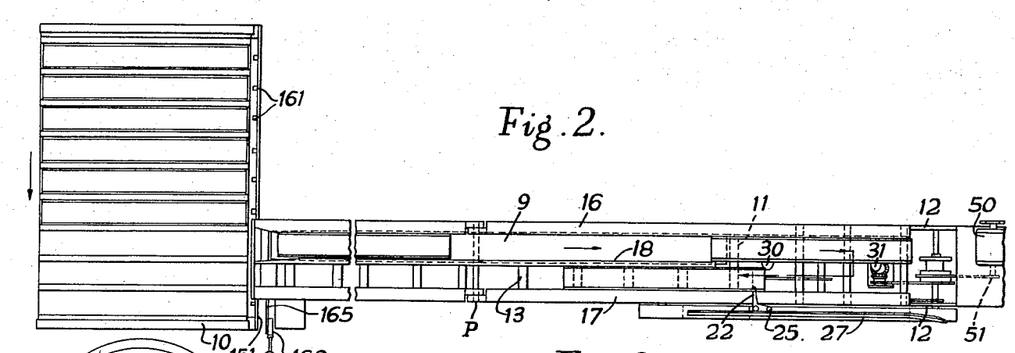
Figure 2 is a plan view of conveyor-means for cigarette trays.
Figure 3:
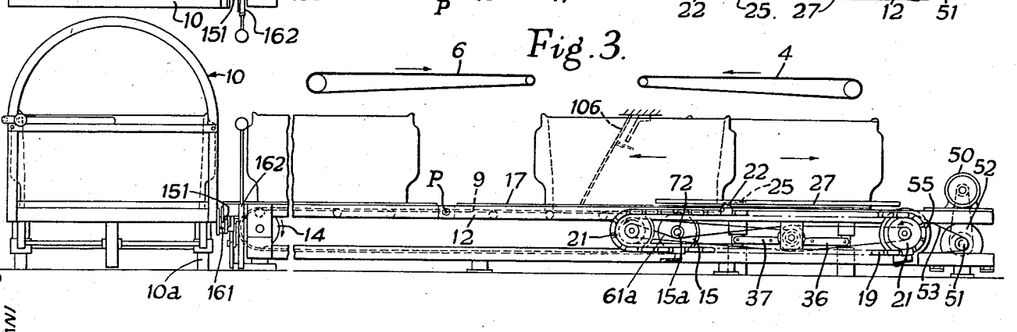
Figure 3 is a front elevation of the apparatus shown in Figure 2.

Figures 2 and 3 show the conveyor-means in more detail. Beyond the end of the conveyor 9 is a series of rollers 11 which support trays after they leave the conveyor 9. These rollers are mounted for free rotation in side frames 12 and extend across the whole width of the two side by side paths taken by the trays. Alongside the conveyor 9 is a further series of short rollers 13, which support trays moving to the left in Figures 2 and 3 after they have left the rollers 11.

The conveyor 9 is formed by a chain of intercalated links which form a flat conveying surface and pass over sprockets 14 and 15. Side guides 16 and 17, with an intermediate guide 18, are provided to guide the trays on the various conveyors.

These conveyors on which trays are supported, and their supporting frames, may conveniently be termed collectively the conveyor bed.

A chain conveyor 19, passing over sprocket 21, is provided for conveying trays towards the left, Figures 2 and 3, over the rollers 11. The conveyor 19 is provided with lugs 22, which engage the rear ends of trays as shown in Figures 2 and 3 and also in Figure 10. It will be noticed that a lug 22 pushes a tray only a limited distance, sufficient to make room for a further tray to be moved sideways into position behind it. After it has been disengaged by the lug 22, its forward movement is given to it by the next succeeding tray.

Figure 10:
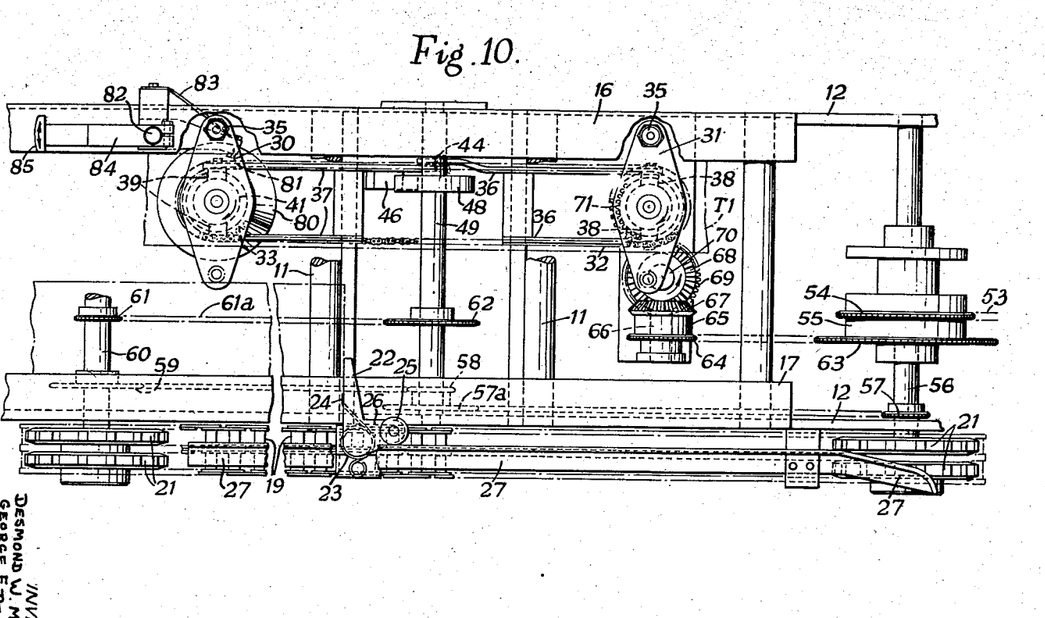
Figure 10 is a plan view, on a larger scale, of the apparatus shown in the right-hand part of Figure 2.

The lugs 22, as shown better in Figure 10, are each pivotally mounted at 23 on the conveyor 19 and urged by a spring 24 to swing backwardly, that is clockwise in Figure 10. This is prevented by engagement between a roller 25, carried by a tail 26 of the lug, and a guide rail 27. When the roller 25 moves past the end of the guide rail, the lug swings backwardly to disengage the tray which it has been pushing. At the right-hand end of the rail 27, as seen in Figures 2, 3 and 10, the rail is flared outwardly to provide a lead for a roller 25 just entering the upper run of the conveyor 19.

In Figure 3 the catcher bands 4 and 6 are also shown diagrammatically to indicate their position relatively to the conveyor-means and also to show the location of the collecting station, to be referred to in detail later.

Figure 11:
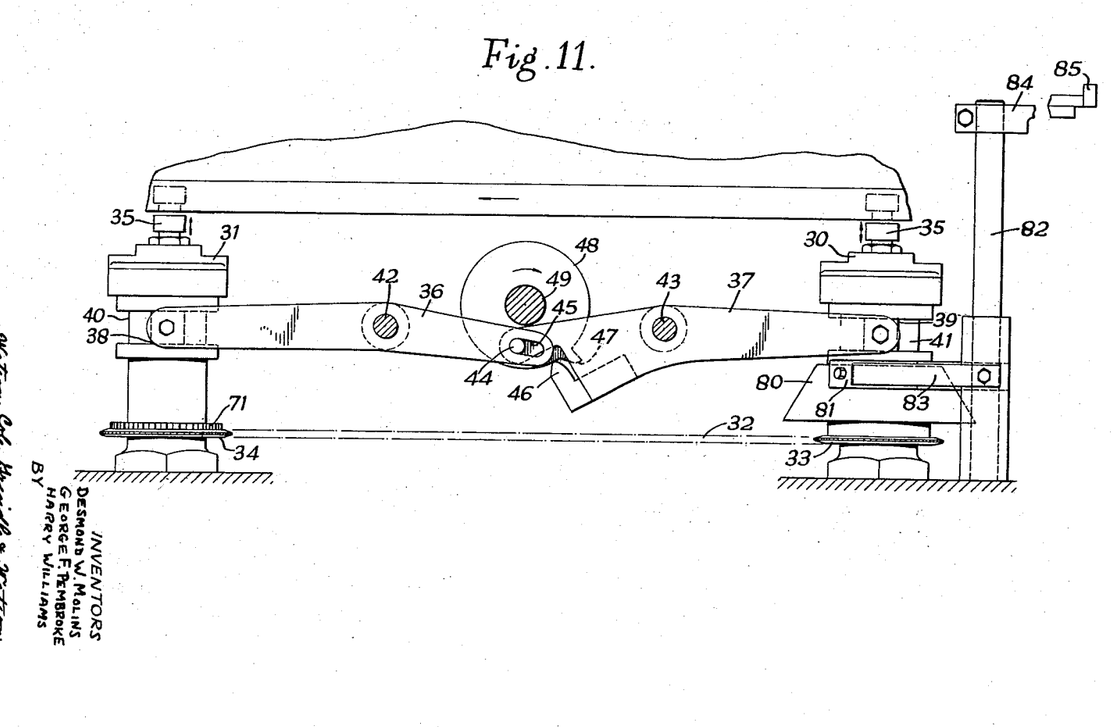
Figure 11 is an elevation of some of the mechanism shown in Figure 10.

The means for transferring trays sideways from one path to the other is best illustrated in Figures 10 and 11. This comprises a pair of cranks 30 and 31 arranged to rotate about vertical axes. For this purpose the cranks are keyed on vertical shafts arranged to be continuously rotated by a chain 32 passing about sprockets 33 and 34.

The cranks are free to slide up and down their shafts while rotating. Each crank carries an upwardly projecting roller 35. When the cranks are in their lowermost position, as shown in full lines in Figure 11, the rollers 35 are below the level of trays passing along the conveyor bed, and thus the cranks simply rotate beneath a tray without affecting it in any way. Means are, however, provided to raise the cranks at predetermined times to a level at which the rollers 35 will engage one side of a tray. This operation is, of course, timed to occur at a moment when the two rollers are clear of the tray and about to move in the direction in which the tray is to be pushed. This is the position in which the rollers 35 are shown in Figure 10, where the position of a tray $T^1$ about to be engaged by the rollers is indicated in partial outline by dot and dash lines.

The tray pushed sideways in this manner slides along the supporting rollers 11 and is lined up against the side guide 17. In this position the tray is engageable by a lug 22, as already described.

In order to move the cranks upwardly at the appropriate times, a pair of forked levers 36 and 37 are provided, Figures 3, 10 and 11, the forks carrying blocks 38 and 39 which fit in grooves 40 and 41, respectively, formed in the hubs of the cranks 31 and 30. The two levers are pivoted at 42, and 43, and their adjacent ends are linked together by a pin 44 on the lever 37 engaging in a slot 45 in the lever 36. The lever 37 is also provided with a projecting tail 46 adapted to be engaged and depressed by a projection 47 on a cam 48 fixed on a shaft 49. When this occurs, the lever 37 is turned about its pivot, and the pin 44 in the slot 45 causes the lever 36 simultaneously to turn about its pivot. Accordingly the forked ends of both levers are raised, thus raising the cranks.

The driving arrangements for the mechanism so far described are as follows. An electric motor 50, Figure 3, drives a spindle 51 through reduction gearing 52, and the drive is transmitted from the spindle 51 by a chain 53 to a sprocket 54, Figure 10, on a clutch 55 mounted on a shaft 56. Fixed on the shaft 56 is a sprocket 57 connected by a chain to a large sprocket 57a which forms part of a compound sprocket which is loose on the shaft 49. The other part 58 of the compound sprocket drives a chain which also passes about a sprocket 59 fixed on a shaft 60. Fixed on the end of the shaft 60 are the sprockets 21 which drive the conveyor chain 19. The rear sprockets 21 about which the chain 19 also passes are loose on the shaft 56.

The shaft 60 also has fixed on it a further sprocket 61, which is connected by a chain to a larger sprocket 62 fixed on the shaft 49, and thereby drives the shaft 49 and thus causes rotation of the cam 48.

Mounted on the clutch body 55 is a large sprocket wheel 63. This is connected by chain drive to a sprocket 64, formed on a hub 65 freely rotatable on a short shaft 66. The hub 65 also carries a bevel gear 67, which meshes with a further bevel gear 68 to which is fixed a gear 69, the gears 68 and 69 being rotatable about a vertical shaft 70.

The gear 69 drives a gear 71 to which is fixed the sprocket 34 by which rotation is imparted to the sprocket 33 and the cranks 30 and 31 are thereby rotated continuously.

The conveyor 9 is driven as follows. The sprockets 15, Figure 3, are fixed on a shaft 15a on which is also fixed a sprocket 72, which is driven by a chain 61a which connects the sprockets 61 and 62 as previously described. This is diagrammatically illustrated in Figure 3.

A device for intercepting trays at certain times is illustrated in Figures 10 and 11. A cone 80 is mounted for rotation with the crank 30 and also for up and down movement with the crank. The cone is engaged by an arm 81 fixed on a rotatable post 82, and the arm 81 is pressed against the cone by a leaf spring 83. A further arm 84 is fixed at the top of the post, and has an extension 85 at its free end. When the cone rises, the arm 81 is swung counterclockwise as viewed in Figure 10, thus rotating the post and causing the arm 84 to swing counterclockwise. This brings the extension 85 into the path of trays which are being fed by the conveyor 9 towards the right, Figures 2, 3 and 10. Thus whenever the cranks rise to push a tray sideways as already described, the extension 85 intercepts the next succeeding tray and prevents it from moving forwardly until the preceding tray has been moved completely clear. When a tray is so intercepted, the conveyor 9 will slip beneath it. When the cranks descend, the extension 85 is withdrawn and the tray that has been intercepted by it is able to proceed.

Figures 4, 5:
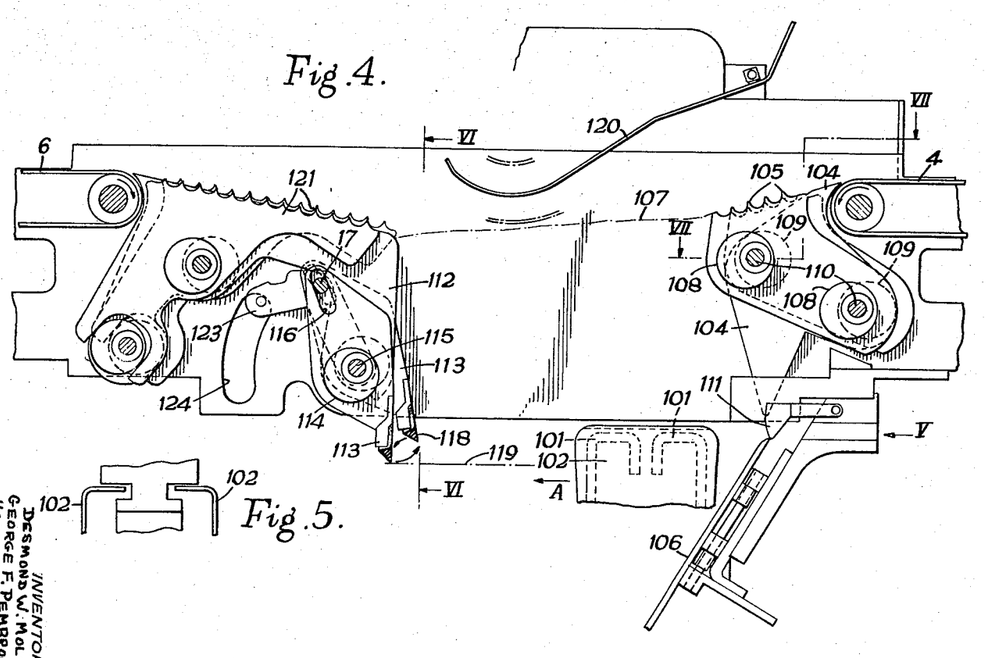
Figure 4 is a front elevation of cigarette-feeding mechanism omitted from Figure 3.
Figure 5 is a view of part of Figure 4 in the direction of the arrow V.
Figure 6:
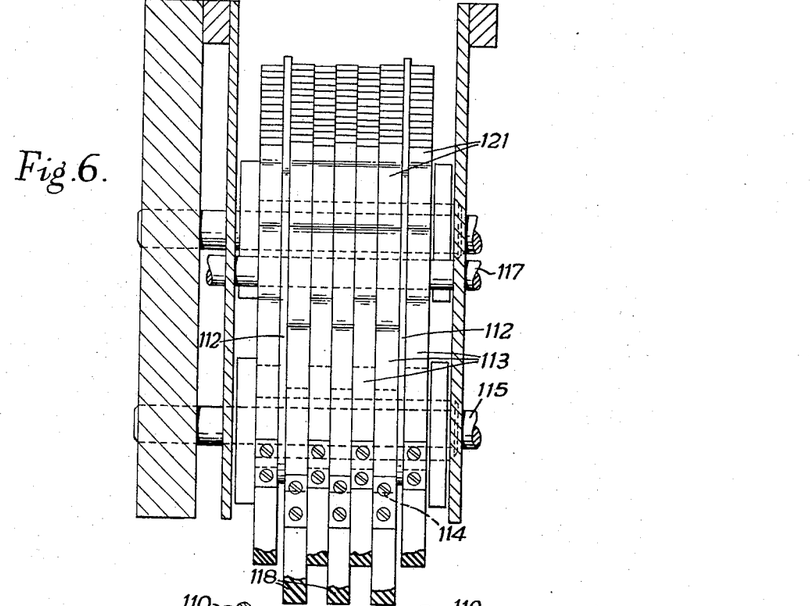
Figure 6 is a section of Figure 4 on the line VI—VI.
Figure 7:
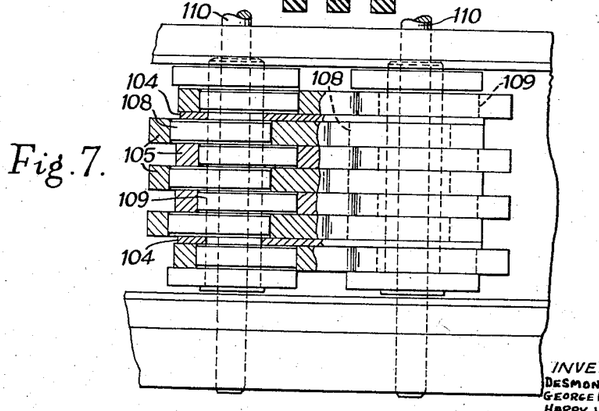
Figure 7 is a section of Figure 4 on the line VII—VII.

Referring now to Figures 4 to 7, these illustrate mechanism by which cigarettes from the catcher bands are fed to the collecting station where they pass down into successive trays. In Figure 4, the upper parts of the ends of two adjacent trays (of a slightly different construction from that shown in Figure 3) are indicated at 101, and it will be seen that the gap between them is bridged by plate-like members 102, whose upper surfaces are made broad, as shown in Figure 5, to provide flat horizontal surfaces that will not injure the cigarettes beneath which they pass. The trays move along in the direction shown by the arrow A. Near the delivery end of the catcher band 4 is a pair of guide-plates 104, which extend from between adjacent feeder-bars 105, and bridge the gap between the catcher band 4 and the feeder bars. The lower parts of the guides 104 also guide cigarettes towards a tray guide 106, which leads the cigarettes down to the bottom of the trays in the usual manner. The broken line 107, Figure 4 indicates the normal height of cigarettes when the apparatus is working and it is important that this level should be substantially maintained while cigarettes are moving into the trays, so that the whole area below the line 107 is occupied by a mass of cigarettes.

The feeder bars 105 comprise a number of narrow feeding bars, grooved on their upper surfaces as shown, and arranged side by side, alternate and intermediate bars being mounted on eccentrics 108 and 109 respectively. The eccentrics are on common shafts 110, and thus, as these shafts rotate, alternate bars move up while intermediate bars are moving down. Cigarettes reposing in the grooves in the upper surfaces of the bars are thus transferred from alternate bars to intermediate bars as the latter rise and move forwardly while the former fall and move rearwardly. In this way there is a steady progression of cigarettes from the catcher band 4 to the cigarette mass at the level of 107, and cigarettes in transit are maintained parallel to each other. The side of the mass of cigarettes at the right-hand side of Figure 4 is defined by the guide-plates 104, and the guide 106 and an intermediate guide 111, which latter is movable on a pivot to permit the passage of a tray end, and drops back into the position shown as soon as the tray end has passed.

The other side of the mass of cigarettes is defined by fixed guides 112 equivalent to the plates 104, and by a number of oscillatory levelling members 113. These latter are carried on eccentrics 114 on the shaft 115, and may be all or substantially the same thickness as the feeder bars 105. Slots 116 are provided in the members 113, and a fixed bar 117 passes through the slots so that as the shaft 115 rotates, the members 113 make oscillatory movements as indicated by the curved arrows, Figure 4. The lower ends of the members are provided with rubber toes 118, and in operation these toes push back the cigarettes as a tray is passing, so as to preserve a level in each tray which is substantially that indicated by the broken line 119, Figure 4.

Another set of feeder bars 121 is associated with the catcher band 6. These are mounted and operated similarly to the feeder bars 105.

The levelling members 113 may be moved out of their operative position, to allow the end of a tray to pass, by a device which causes them to be swung about the eccentric shaft 115 as a lever 123 is swung downwards in a slot 124. The action of the rubber toes then is to sweep away the cigarettes resting on the upper faces of the plate-like members 102.

The level of the cigarettes near the line 107, Figure 4, causes a detector lever 120 to rise or fall, and the tray speed to alter accordingly. This speed variation may be accomplished in any suitable and convenient way. Alternatively the level of the cigarettes may be detected by means of a photo-electric cell towards which a light beam is directed across the cigarettes.

Figure 12:
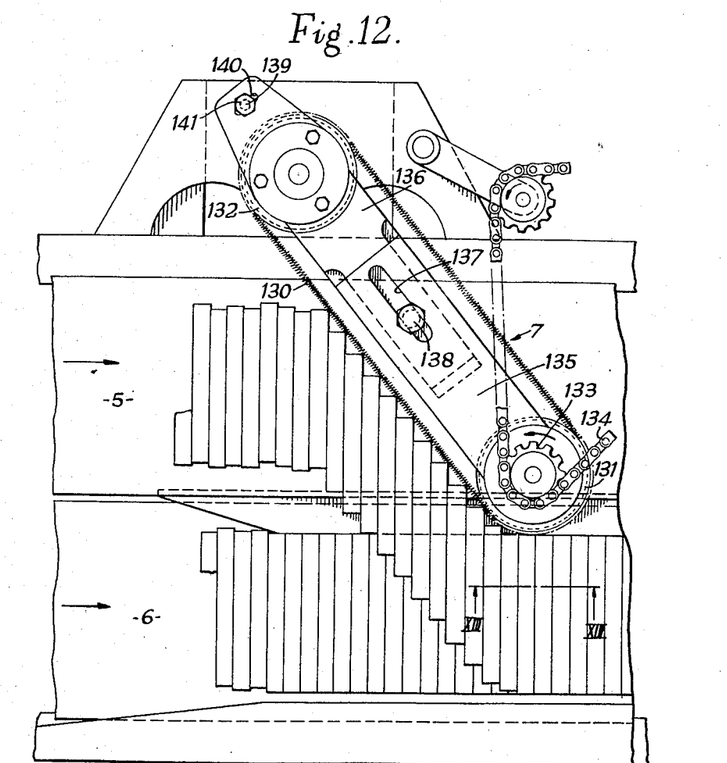
Figure 12 is a plan view of cigarette transfer apparatus.
Figure 13:
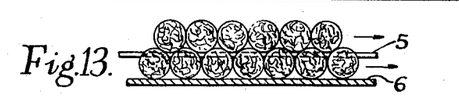
Figure 13 is a section on the line XIII—XIII, Figure 12.

The transfer of cigarettes from the bands 3 and 5 to the bands 4 and 6, respectively, is illustrated in Figures 12 and 13, which shows a transfer device 7 associated with the bands 5 and 6. The corresponding device 7 for the bands 3 and 4 functions in exactly the same way and is therefore not described separately.

As already stated, the band 5 is at a higher level than the band 6.

An endless moving transfer band 130 is arranged obliquely across the surface of the band 5, and is arranged to move in the direction shown by the arrow. The transfer band 130 consists of resilient wire wound in a flattened helix, and is thus easily extensible, and the turns of the wire also provide numerous separate slat-like parts which can engage the edges of the ends of cigarettes on the band 5, as shown.

The spring band 130 passes about pulleys 131 and 132. The pulley 131 has fixed on it a sprocket 133 which is driven by a chain 134 in any convenient manner.

The two pulleys are mounted in a frame consisting of two relatively slidable parts 135 and 136 whereby the frame can be shortened or lengthened as desired, and are slotted at 137 so that they can be locked together by a nut 138. Also the frame is pivoted at 139 and can be swung about its pivot to alter the angle of the spring band 130 across the catcher band 5. A slot 140 permits the frame to be locked by a nut 141 in various angular positions.

As shown, the frame and the spring band 3 are arranged at an angle of 45° to the direction of movement of the band 5. The pulleys are arranged to be rotated at such a speed that the movement of the spring band, in the direction indicated by the arrow, has a component in the direction of movement of the bands 5 and 6 which has substantially the speed of those bands. Thus cigarettes carried transversely of their axes on the band 5 are engaged by the spring wire band and thereby gradually moved lengthwise, while continuing to move forward with the band 5. As the band 5 is above the level of the band 6, the cigarettes are pushed on top of those lying on the band 6, as shown in Figure 13.

Figure 8:
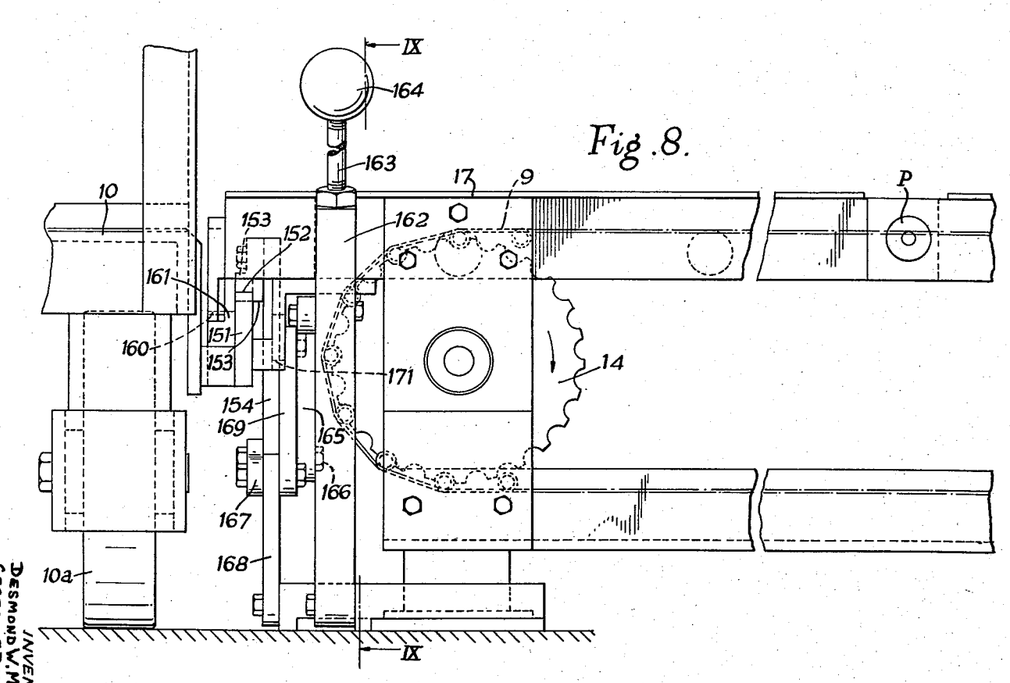
Figure 8 shows on an enlarged scale part of the apparatus shown in Figure 3.

Means whereby the trolley 10, already mentioned in relation to Figure 1, is connected to the conveyor bed and is disconnected from it and moved forwardly a predetermined amount will now be described with particular reference to Figures 8 and 9 and also with reference to Figures 2 and 3. The trolley is moved step by step forwardly at the required times, to bring successive empty trays into line with the path they are to follow along the conveyor bed, and at the same time to present a space into which a full tray can be slid from the conveyor bed. The mechanism about to be described is for use in effecting accurate stepwise movement of the trolley while locking it in position after each such movement.

Figure 9:
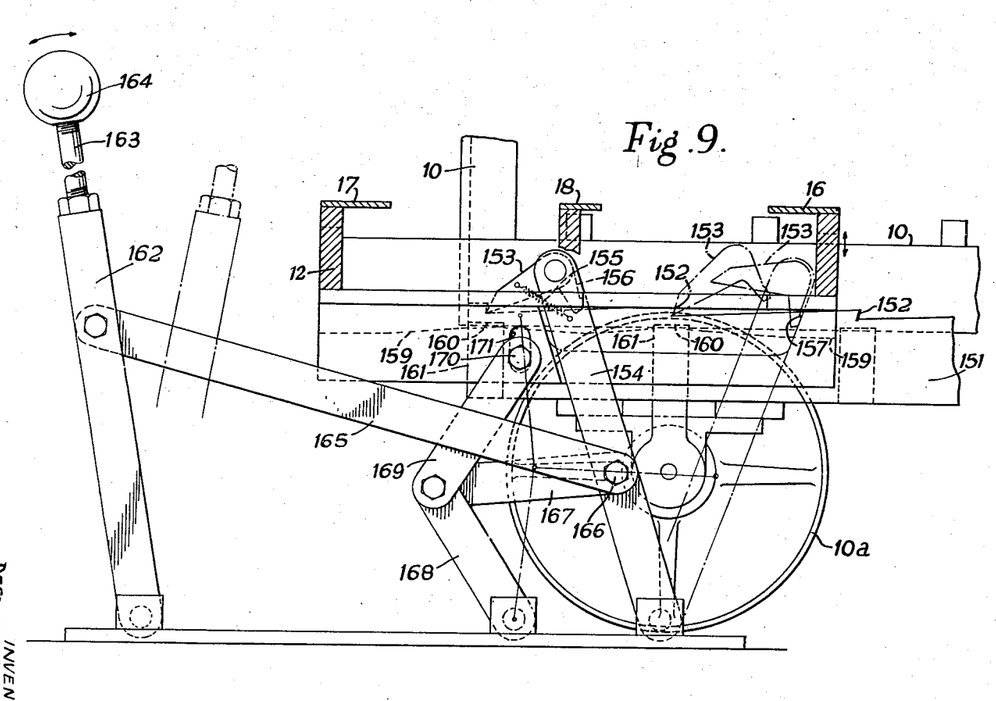
Figure 9 is a section on the line IX—IX, Figure 8.

The mechanism is disposed between a trolley 10 and the end of the conveyor bed, and in Figure 9 is viewed looking towards the trolley. Part of the trolley, including a wheel 104, is shown in Figures 8 and 9. Attached to the trolley is a rack 151 provided with teeth 152 spaced apart a distance equal to the spacing of the trays on the trolley. A pawl 153 pivoted on an arm 154 is provided for the purpose of engaging successive teeth on the rack and pushing the rack, and thereby the trolley, forwardly step by step. The arm 154 and pawl 153 are shown in full line at the completion of a forward stroke in which the pawl has pushed the rack one step forwardly, and the arm 154 and pawl 153 are shown in dot and dash line at the end of a rearward stroke. The pawl 153 is normally spring-urged downwardly into engagement with the rack 151 by a spring 155, but as the arm reaches its rearmost position a tail 156 on the pawl is pressed against a surface 157 whereby the pawl is turned about its pivot into a raised position as shown at the extreme right-hand position of the pawl in Figure 9. This figure also shows in dot and dash line the pawl at the commencement of a forward stroke, the tail 156 having moved away from the surface 157.

As already mentioned, the conveyor bed comprises side guides 16, 17 and 18 for the trays, and these are shown in part section in Figure 1. At the end of the conveyor bed is an extension 159 extending the full width of the conveyor bed, and the lower edge of this extension has two recesses 160 which are adapted to be entered by blocks 161 fixed on the side of the rack 151. The engagement of a pair of blocks 161 in the two recesses 160 locks the trolley in position relatively to the conveyor bed.

The conveyor bed is pivoted at P, Figures 2 and 3, so as to allow its end to be lifted slightly in order to allow the blocks 161 to be disengaged from the recesses 160 when it is desired to move the trolley forward.

The mechanism just described makes it possible to raise and lower the liftable part of the conveyor bed simultaneously with the movement of the pawl 153.

The arm 154 carrying the pawl 153 is moved to and fro by means of a lever 162, which is provided with a long extension 163 and a knob 164 to be grasped by the attendant. The lever 162 is connected to the arm 154 by a link 165 pivoted to the arm 154 at 161. Also pivoted at 166 on the arm 154 is a link 167 which is connected to a pair of links 168, 169 constituting a toggle joint. A pin 170 projects from the upper end of the link 169 through a slot 171 in a part of the liftable part of the conveyor bed. When the lever 162 is swung to the right from the position in which it is shown in full line in Figure 9, the arm 154 is also swung to the right, carrying the pawl 153 rearwardly, and at the same time the toggle joint straightens out and the pin 170 engages the upper edge of the slot 171 and raises the liftable part of the conveyor bed, so that the recessed lower edge of the part 159 is raised clear of the blocks 161. When the arm 154 has reached its extreme rearward position as shown in dot and dash lines, the toggle has passed just over its centre and the links 168 and 169 are in the position indicated by dot and dash lines. The conveyor bed is then in raised position, and remains in raised position during the first part of the forward stroke of the arm 154, since during this forward stroke the toggle first lifts the conveyor bed slightly and then gradually lowers it. After the pawl has moved the rack a sufficient distance forward for the blocks 161 to move away from the recess 160, continued downward movement of the conveyor bed brings the lower edge of the part 159 to rest on the blocks 161, which thereafter slide forward beneath the edge until the recesses 160 come into register with a pair of blocks, which then slip into the recesses and prevent any further forward movement of the rack 151. Simultaneously the pawl 153 reaches the end of its forward travel. During this forward stroke the rack 151, and therefore the trolley to which the rack is fixed, has moved forward one tray pitch, that is to say, the correct distance to bring an empty tray on the trolley into line with the path on the conveyor bed defined by the guides 16 and 18 shown in Figure 9, and at the same time to bring an empty space on the trolley in line with a tray which is between the guides 17 and 18. The said empty tray can then be slid on to the conveyor bed and the full tray slid on to the trolley.

As mentioned above, the pawl 153 is raised away from the teeth of the rack 151 at the end of each rearward stroke. This enables the trolley to be wheeled rearwardly into starting position, in order to commence the feeding of empty trays on to the conveyor bed, without interference between the pawl and the rack.

In operation, when the trolley has been placed in its starting position, an empty tray is pushed by the attendant on to the conveyor bed between the guides 16 and 18. The conveyor 9 carries the empty tray forwardly between these two guides. The attendant then operates the handle 163 to move the trolley forward one step, thus bringing the empty space just vacated by a tray into line with the space between the guides 17 and 18 ready to receive a full tray. Or the trolley may have one empty space to start with, so that a full tray can be moved into one space and an empty tray pushed from an adjacent space while the trolley stays in the same position. When the trolley has been moved forward one step, the handle 163 is left in the "forward" position so that the trolley remains locked to the conveyor bed until it is desired to move it again. Thus each time it is desired to move the trolley the handle must be moved rearwardly, then forwardly.

What we claim as our invention and desire to secure by Letters Patent is:

1. A cigarette production unit which comprises two continuous rod cigarette-making machines arranged side by side, each machine having a catcher band extending therefrom and arranged to receive cigarettes as they are produced by the machine, the two catcher bands extending from the respective machines in opposite directions toward each other, a collecting station common to both catcher bands and to which the latter convey cigarettes from both machines, and collecting mechanism associated with said common collecting station to collect the combined product of the two machines at the said collecting station.

2. Apparatus as claimed in claim 1, comprising conveyor-means to convey trays in succession through said collecting station, and means to feed the combined product of said cigarette-making machines into the said trays as the latter pass through the collecting stations.

3. Apparatus as claimed in claim 2, wherein the said conveyor means comprises means to feed trays lengthwise in one direction in a path past said collecting station, means to move trays sideways into an adjacent path, and means to feed said trays lengthwise in said adjacent path through said collecting station in a direction reverse to said one direction.

4. Apparatus as claimed in claim 3, comprising a a receptacle for trays adjacent one end of said conveyor-means, said receptacle being movable in a direction transverse to said paths to bring successive trays into register with one of said paths, and arranged to be connected to and disconnected from said conveyor-means, and means to effect movement of said receptacle by a predetermined distance, said last-named means including means to disconnect the receptacle from the said conveyor-means to permit said movement, and to reconnect the receptacle to the said conveyor-means when the receptacle has moved said predetermined distance.

5. Apparatus as claimed in claim 4, wherein the said conveyor-means comprises a fixed part and a liftable part, and wherein the said liftable part and the said receptacle respectively comprise inter-engageable parts whereby the receptacle and the conveyor-means can be locked together at different positions of the receptacle and comprising a moveable pawl on said fixed part and abutments carried by said receptacle and engageable by said pawl to move the receptacle, and means to move said pawl, said last-named means being operative to raise and lower said liftable part, thereby disconnecting said inter-engageable parts to permit movement of the receptacle, and then reconnecting them.

6. Apparatus as claimed in claim 5, comprising a lever to effect movement of said pawl, a toggle operative to raise and lower said liftable part, and means connecting said toggle to said lever for operation by the latter.

7. Apparatus as claimed in claim 3, wherein the means to move trays sideways from the said one path to the said adjacent path comprises a pair of cranks arranged to engage successive trays and push them sideways.

8. Apparatus as claimed in claim 7, wherein said cranks are arranged for rotation about substantially vertical axes and below the level of the tray, and means are provided to cause upward movement of the cranks so that upwardly projecting elements thereon engage the side of a tray and push the latter sideways.

9. Apparatus as claimed in claim 8, wherein the said cranks are keyed on vertical shafts and are movable up and down on said shafts by cam-operated means arranged to be operated in timed relationship with the said conveyor-means.

10. Apparatus as claimed in claim 1, wherein two catcher bands, arranged side by side extend from each cigarette-making machine, and wherein transfer means is provided to cause cigarettes to be transferred from one to the other of the said two catcher bands, whereby a single row of cigarettes coming from each machine is delivered to the collecting station.

11. Apparatus as claimed in claim 10, wherein the said transfer means comprises a movable member arranged obliquely across the said one catcher band and arranged to move with a component transverse to the direction of movement of said one catcher band, and another component which is in the said direction and has substantially the same speed as the forward movement of the said catcher bands.

12. Apparatus comprising a first member and a second member and means for causing stepwise movement of said first member relatively to said second member the said second member comprising a fixed part and a liftable part, a pawl movably mounted on said fixed part and adapted to engage teeth carried by the first member and to move said teeth so as to move the first member stepwise, inter-engaging parts on the first member and on said liftable part of the second member, respectively, by which the two members can be locked together, and means to move the said pawl and at the same time to raise and lower said liftable part in such manner as to disengage the two members to permit movement of the first member by the said pawl, and to re-engage the two members in locked relationship after such movement.

13. Apparatus as claimed in claim 12, wherein the said means to raise and lower the said liftable part comprises a lever on which said pawl is mounted, whereby a toggle joint connected to said lever movement of said lever operates the toggle so as to raise the liftable part.

14. In cigarette collecting mechanism, means to feed cigarette receptacles endwise in two side by side paths, and transfer means to transfer a receptacle from one path to the other, said transfer means comprising a pair of cranks provided with elements projecting upwardly therefrom and arranged for rotation about substantially vertical axes and below the level of the receptacle, and means to cause upward movement of the cranks so that the said upwardly projecting elements thereon engage the side of a receptacle and push the latter sideways.

15. Apparatus as claimed in claim 14, comprising vertical shafts on which the said cranks are keyed so as to be movable up and down on said shafts, and by cam-operated means for moving said cranks up and down, said cam-operated means being arranged to be operated in timed relationship with the said means to feed the cigarette receptacles.

16. In a cigarette feeding apparatus, means to transfer cigarettes from a row of cigarettes traveling in a path in a direction transverse to their axes, to a second path extending alongside and in the same general direction as the first said path, a conveyor system to support and move the said cigarettes and defining the two said paths, said means comprising a flexible element arranged above the said conveyor system and extending obliquely across only the first said path and arranged to move with a component in the direction in which it is desired to transfer cigarettes, and another component which is in the direction of and has substantially the same speed as the forward movement of the said row, the said element having a continuous cigarette engaging face which is uneven so as to be capable of frictionally engaging edges of the end faces of the said cigarettes and thereby urging them lengthwise across the said conveyor system toward the said second path.

17. A device as claimed in claim 16, wherein the said flexible element comprises a coiled wire element, individual coils of which engage the said edges of the end faces of cigarettes.

References Cited in the file of this patent
UNITED STATES PATENTS

| | | |
|---|---|---|
| 1,729,671 | Bell-Irving et al. | Oct. 1, 1929 |
| 2,019,080 | Johnson et al. | Oct. 29, 1935 |
| 2,260,587 | Shields | Oct. 28, 1941 |
| 2,285,283 | Jones | June 2, 1942 |
| 2,572,650 | Molins | Oct. 23, 1951 |
| 2,732,057 | Temple | Jan. 24, 1956 |
| 2,765,603 | Rose | Oct. 9, 1956 |